United States Patent
Stobbe

(10) Patent No.: US 7,958,713 B2
(45) Date of Patent: *Jun. 14, 2011

(54) TEXTILE MATERIAL WITH ANTENNA COMPONENTS OF AN HF TRANSPONDER

(75) Inventor: Anatoli Stobbe, Barsinghausen (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 966 days.

This patent is subject to a terminal disclaimer.

(21) Appl. No.: 10/587,581

(22) PCT Filed: Jan. 15, 2005

(86) PCT No.: PCT/DE2005/000056
§ 371 (c)(1), (2), (4) Date: Sep. 11, 2006

(87) PCT Pub. No.: WO2005/073824
PCT Pub. Date: Aug. 11, 2005

(65) Prior Publication Data
US 2007/0139201 A1 Jun. 21, 2007

(30) Foreign Application Priority Data

Jan. 30, 2004 (DE) .......................... 10 2004 005 017

(51) Int. Cl.
*D02G 3/02* (2006.01)
*D02G 3/22* (2006.01)
(52) U.S. Cl. ......................................................... 57/210
(58) Field of Classification Search ............... 57/210; 343/897
See application file for complete search history.

(56) References Cited

U.S. PATENT DOCUMENTS

| 5,049,855 A | 9/1991 | Slemon et al. |
| 5,906,004 A | 5/1999 | Lebby et al. |
| 6,154,138 A | 11/2000 | Nilsson |
| 6,377,216 B1* | 4/2002 | Cheadle et al. ........ 343/700 MS |
| 6,675,461 B1 | 1/2004 | Rowson et al. |
| 6,687,523 B1* | 2/2004 | Jayaramen et al. ........... 600/388 |
| 6,727,197 B1* | 4/2004 | Wilson et al. ................. 442/301 |
| 6,766,817 B2 | 7/2004 | da Silva |
| 6,852,395 B2* | 2/2005 | Dhawan et al. ............... 428/196 |
| 6,918,404 B2 | 7/2005 | Dias da Silva |

(Continued)

FOREIGN PATENT DOCUMENTS

DE 197 55 792 C2 6/1999

(Continued)

OTHER PUBLICATIONS

International Search Report.

(Continued)

*Primary Examiner* — Shaun R Hurley
(74) *Attorney, Agent, or Firm* — Collard & Roe, P.C.

(57) ABSTRACT

A textile material with antenna components for an HF transponder is disclosed, which may be operated by connection of a circuit module to the antenna components, adjusted, or which may be adjusted to a working frequency. The antenna components comprise electrically-conducting components of the textile material itself, which may be formed as an E-field antenna, using the geometry thereof to match a working frequency in the UHF or microwave range, or by means of interruptions to, or extension of a conducting length.

12 Claims, 4 Drawing Sheets

U.S. PATENT DOCUMENTS

| | | |
|---|---|---|
| 7,066,586 B2 | 6/2006 | da Silva |
| 7,285,255 B2 | 10/2007 | Kadlec et al. |
| 7,486,252 B2 | 2/2009 | Hiltmann et al. |
| 2001/0050645 A1 | 12/2001 | Boyle |
| 2003/0085619 A1 | 5/2003 | Strache et al. |
| 2003/0160732 A1 | 8/2003 | Van Heerden et al. |
| 2007/0212281 A1 | 9/2007 | Kadlec et al. |
| 2007/0251207 A1* | 11/2007 | Stobbe .......................... 57/218 |

FOREIGN PATENT DOCUMENTS

| | | |
|---|---|---|
| DE | 198 43 237 C1 | 5/2000 |
| WO | WO 01/36728 A | 5/2001 |

OTHER PUBLICATIONS

Post E. R. et al, [Smart Fabric, or "Wearable Clothing"], Wearable Computers, 1997. Digest of Papers., First International Symposium on Cambridge, MA, USA Oct. 13-14, 1997, Los Alamitos, CA, USA, IEEE Comput. Soc, U.S., Oct. 13, 1997, pp. 167-168, XP010251560.

Jung, Stefan et al., "Enabling Technologies for Disappearing Electronics in Smart Textiles", 2003 IEEE International Solid-State Circuits Conference, 0-7803-7707-9/03.

Kallmayer, Christine et al., "New Assembly Technologies for Textile Transponder Systems", 2003 Electronic Components and Technology Conference, 0-7803-7991-5/03, pp. 1123-1126.

Warrior et al. "They Know Where You Are," IEEE Spectrum, Jul. 2003, pp. 20-25.

Marculescu et al., "Electronic Textiles: A Platform for Pervasive Computing," Proceedings of the IEEE, vol. 91, No. 12, Dec. 2003, pp. 1995-2018.

* cited by examiner

TEXTILE MATERIAL WITH ANTENNA COMPONENTS OF AN HF TRANSPONDER

CROSS REFERENCE TO RELATED APPLICATIONS

Applicant claims priority under 35 U.S.C. §119 of German Application No. 10 2004 005 017.1 filed Jan. 30, 2004. Applicant also claims priority under 35 U.S.C. §365 of PCT/DE2005/000056 filed Jan. 15, 2005. The international application under PCT article 21(2) was not published in English.

BACKGROUND OF THE INVENTION

1. Field of the Invention

The invention relates to a textile material with antenna components of an HF transponder which may be operated by connection of a circuit module to the antenna components which are tuned or may be tuned to a working frequency.

2. The Prior Art

Transponders are increasingly being used for the identification of goods in production, logistics, marketing and repair, these being superior to conventional barcodes with regard to legibility and data volume as well as security against tampering. Attempts are also being made to use transponders in textile goods but because of their flexible character and the need for cleaning in hot and/or chemically aggressive media, higher requirements are imposed.

Thus, the transponder must not impair the use of textile goods as intended, it must be resistant to mechanical, thermal and chemical influences and despite this, work physically reliably.

It is known to equip textile labels with transponders operating in the 13 MHz range. M-field antennas with coreless coils, also called air-cored coils are used as antennae. The air-cored coils can be executed in the form of metal conductor paths on film carriers. Combinations of a film layer and a textile layer, e.g. as laminate are mostly incompatible with the use as intended and with the cleaning of textile goods. The film can become detached in places or completely and/or become damaged. Since textile labels are usually only inserted in the finished goods, and can then be removed therefrom again, it is only possible to identify the raw goods indirectly and this is liable to tampering.

SUMMARY OF THE INVENTION

It is the object of the invention to provide a textile material with antenna components of an HF transponder which can be inserted integrally in raw goods during manufacture and which allows physically reliable use.

This object is achieved in a textile material with antenna components of an HF transponder which may be operated by connection of a circuit module to the antenna components which are tuned or may be tuned to a working frequency, wherein the antenna components consist of electrically conductive components of the textile material itself which may be formed as an E-field antenna, using the geometry thereof to match a working frequency in the UHF or microwave range, or by interruption or extension of a conductive section.

Further developments and advantageous embodiments are discussed below.

As a result of constructing the antenna components as an E-field antenna, also called an electric antenna, tuning to a working frequency in the UHF or microwave range can be achieved with a simple geometry. The available space is larger than in labels so that the configuration of inductive or capacitive extension elements is not necessary. With an E-field antenna, a higher electric component of the electromagnetic alternating field is formed in the near-field range than with an M-field antenna. The E-field antenna thus has a high resistance and is not so susceptible to inferior electrically conductive materials and junction resistances at connections and has a higher efficiency. In addition, the E-field antenna has a broader band than an M-field antenna so that larger tolerances are permissible with regard to agreement between its resonance frequency and the working frequency. The E-field antenna can thus easily be integrated into the textile material whereby the transponder now acquires pure textile properties with regard to the antenna in contrast to the design as a film label having a properties differing from textiles.

At a working frequency in the UHF range, a range between 860 MHz and 930 MHz is allowed here and in the microwave range at about 2400 MHz, unshortened half-wave or quarter-wave antennae can be used if a larger area is available than is usual in the case of textile labels.

The antenna components can be arranged singly or multiply and mutually spaced.

In a multiple arrangement, the most favourable position for the cut section of the goods or the finished goods can be selected from a selection of antenna components. The spacing of the antenna components is appropriately determined such that no influence or only a slight influence or detuning of the actively used antenna occurs.

In web-like material, the antenna components are arranged in the web direction of the web and/or obliquely to the web direction and/or transverse to the web direction.

In this way, antenna components for subsequent connection of circuit modules can be created continuously or at intervals. Complete textile webs can thus be prepared for connection of circuit modules after the manufacturing process and cutting to form the finished products.

The antenna components can form at least one symmetrical $\lambda/2$ dipole or at least one $\lambda/4$ groundplane comprising a $\lambda/4$ antenna and a counterpoise, wherein $\lambda$ corresponds to the wavelength of the working frequency.

As a result, in particular during the weaving production process warp threads and/or weft threads can be used to form tuned, unshortened antennae having a high efficiency. The strictly predefined profile of warp threads and/or weft threads then creates no restrictions for the geometry of the antenna components.

The electrically conductive components of the textile material are electrically conductive printing paste or electrically conducting thread structures which can be processed mechanically within a normal production process for the textile industry.

As a result of being manufactured in a normal production process for the textile industry, the E-field antenna can be produced cost-effectively in one of the production steps which need to be carried out anyway in the production of textile material. The same quality criteria of the textile production process thus also benefit the quality and reproducibility of the E-field antenna. The E-field antenna is necessarily thus an integral component of the textile material itself and does not impair the use of the textile goods as intended.

The electrically conductive thread structure can be a metal-coated plastic thread, a plastic thread wound with metal wire or a metal stranded wire, a plastic thread with a built-in metal wire or a built-in metal stranded wire or a graphite thread.

The choice is dependent on which type of electrically conductive threads can be processed by the respective production process, which type of electrically conductive threads have adequate electrical conducting properties, the manner in which contact is made with connections of the circuit module and whether and which chemical influences are exerted.

The electrically conductive thread structure comprises continuously conducting threads which can be separated at connection points and antenna ends.

Thus, circuit modules can be connected to almost any points of the electrically conductive thread structure and the antenna tuned to the working frequency. In this way, numerous connection possibilities are obtained for the circuit modules and tuning possibilities for the antenna components used as active transponder antennae.

In addition, adjacent threads can be separated when connecting a circuit module.

Any possible detuning, damping or shielding of the active transponder antenna is thereby eliminated.

Alternatively, the electrically conductive thread structure can comprise partially conducting threads between connection points and antenna ends.

This simplifies the installation of a transponder since only the circuit module needs to be connected to the connection points. It is not possible to separate the threads.

The threads can come to the surface of the textile material at outlet points which correspond to the position of connection points and antenna ends and continuously conducting threads can be separated here.

If electrically conductive threads are concealed in the fabric, connection of the circuit module is thus made easier.

The outlet points appropriately have a spacing of $\lambda/4$ of the wavelength of the working frequency.

In this way, the necessary outlet points can be restricted and the electrically conductive threads can be concealed in the fabric.

The antenna components comprise at least one connection point for connection to antenna connections of the circuit module by crimped connections, welded connections, soldered connections or adhesive connections using conductive adhesive.

The circuit module can thus be attached to the connection point after the textile production process or to a suitable connection point if a plurality of connection points are available for selection. The connections are necessary since the textile material is initially fabricated without the circuit module during the production process and the circuit module must then be connected to the antenna components.

Crimped connections have the advantage that they make electrical contact between the antenna connections of the circuit module and the connections on the antenna at the same time as attaching the circuit module. The connection is made by mechanical bracing and can thus also be made between conductive materials which cannot be joined together by welding or soldering.

The circuit module can also be fixed mechanically to the textile material at the same time by means of crimped connections if a plurality of threads can be enclosed which then jointly provide the required tensile strength. These can be electrically conductive and/or non-conductive threads.

Welded connections and soldered connections can be made between conductive materials made of metals. Finally, adhesive connections using conductive adhesives can be made for materials which are not suitable for crimped connections, welded connections and soldered connections.

Preferably during the printing production process, the conductive adhesive can be formed by the printing paste itself. As a result, the printing and making the connection between the antenna connections and the connections on the antenna can be executed in immediately successive working processes by inserting the antenna connections into the still-damp, non-bound printing paste. A separate adhesive is thereby eliminated.

Furthermore, the adhesive surfaces of the adhesive compounds can be UV-permeable and the conductive adhesive can be UV curable. As a result, the adhesive can be cured by UV irradiation over the entire adhesive range in a short time.

The circuit module itself and its antenna connections are preferably enclosed by a potting compound and the potting compound is at the same time connected to the region of the textile material adjacent to the circuit module for mechanical fixing of the circuit module and/or increasing the security against tampering. The circuit module is fixed to the textile material by the potting compound such that the potting compound penetrates deep into the textile material as a result of the capillary effect. Separation is only possible by destruction so that tampering can be identified. Furthermore, the circuit module is protected against mechanical and chemical influences by the potting compound. The additional incorporation of the antenna connections provides protection of the contacts and at the same time provides stress relief at the antenna ends, reducing the risk of breakage at the antenna connections of the circuit module.

A placement area for a circuit module can be specified in a pre-cut section of textile material and the circuit module can be connected to a connection point located in this placement area and fixed therein for identification of the pre-cut section or the finished goods.

By using the numerous connection possibilities, the circuit module can then be used for identification in a pre-cut section or the finished goods and in the finished goods, it can be connected to the nearest connecting parts there, in a non-critical part or region, e.g. behind the lapel or in the collar in the case of a suit. Finished goods can thereby be identified during further processing of the raw goods.

In raw goods of the textile material a placement area for a circuit module is preferably specified in the edge area of the goods and the circuit module can be connected to a connection point located in this placement area and fixed therein for identification of the raw goods. The transponder formed is then used to identify the raw goods such as material bales at the manufacturer and can store all relevant production data.

BRIEF DESCRIPTION OF THE DRAWINGS

Exemplary embodiments of the invention are explained in detail hereinafter with reference to the drawings.

DETAILED DESCRIPTION OF THE PREFERRED EMBODIMENTS

Figure 1:
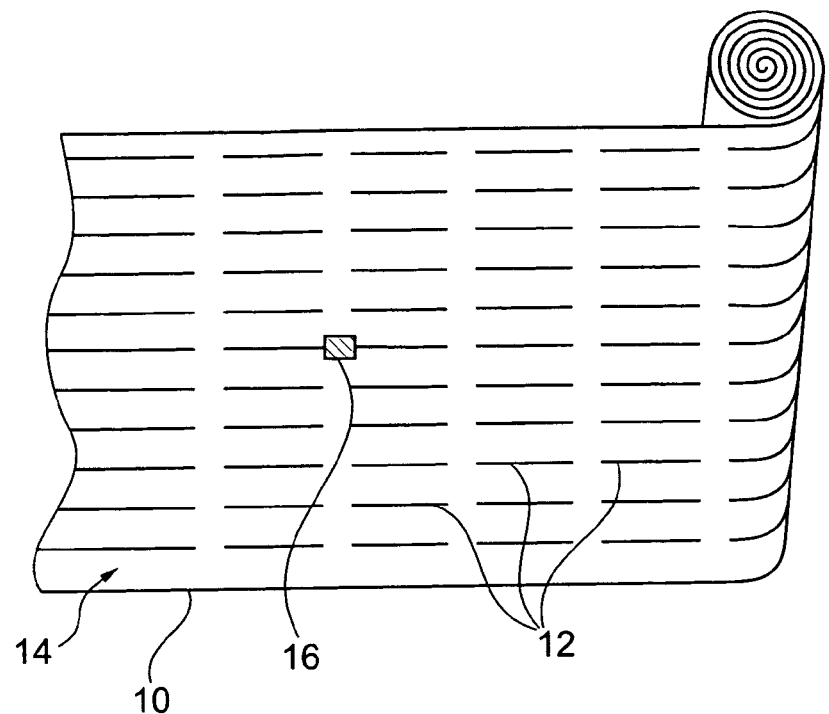
FIG. 1 shows a view of web-like textile goods with electrically conductive threads running exclusively in the direction of the web and an HF transponder.

FIG. 1 shows a view of web-like textile raw material 10 with electrically conductive threads 12 running exclusively in the direction of the web and an HF transponder. The electrically conductive threads 12 run parallel and are mutually spaced. The conductive length is divided into sections 14, each comprising λ/4 of the wavelength of the intended working frequency. The sections 14 can be formed by interrupted threads or continuous threads with an interrupted electrically conductive component. All ends of adjacent electrically conductive sections 14 in the same alignment are suitable as connection points for connection to antenna connections of a circuit module. A circuit module 16 is connected to one of these connection points and forms a λ/2 dipole with the contacted antenna components.

Figure 2:
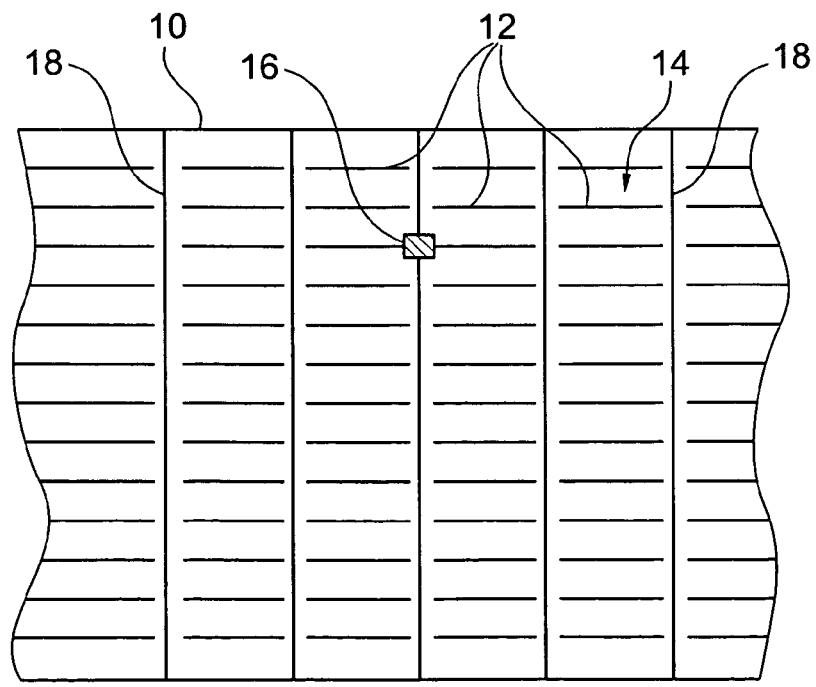
FIG. 2 shows a view of web-like textile goods with electrically conductive threads running alternatively in the web direction and transverse to the web direction and an HF transponder.

FIG. 2 shows a view of web-like textile raw material 10 with electrically conductive threads 12, 18 running alternatively in the web direction and transverse to the web direction and an HF transponder. The electrically conductive threads 12, 18 in the web direction and transverse to the web direction each run parallel and are mutually spaced. The conductive length of the threads in the web direction is divided into sections 14, each comprising λ/4 of the wavelength of the intended operating frequency. The sections 14 can be formed by interrupted threads or continuous threads with an interrupted electrically conductive component. The electrically conductive threads 18 transverse to the direction of the web are continuous. The points of intersection between the threads running in the direction of the web and transverse to the direction of the web are suitable as connection points for connection to antenna connections of a circuit module. A circuit module 16 is connected to one of these connection points and with the contacted antenna components forms a λ/4 groundplane comprising a λ/4 antenna in the form of the antenna component running in the direction of the web and a counterpoise in the form of the antenna component running transverse to the direction of the web.

Figure 3:
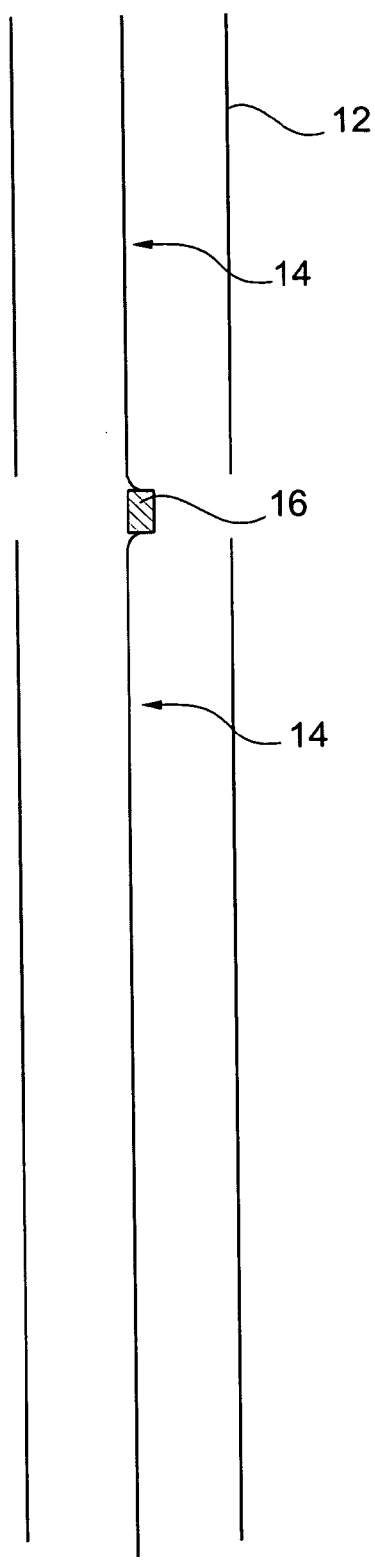
FIG. 3 shows a prototype with a groundplane antenna on a 1:1 scale.
Figure 4:
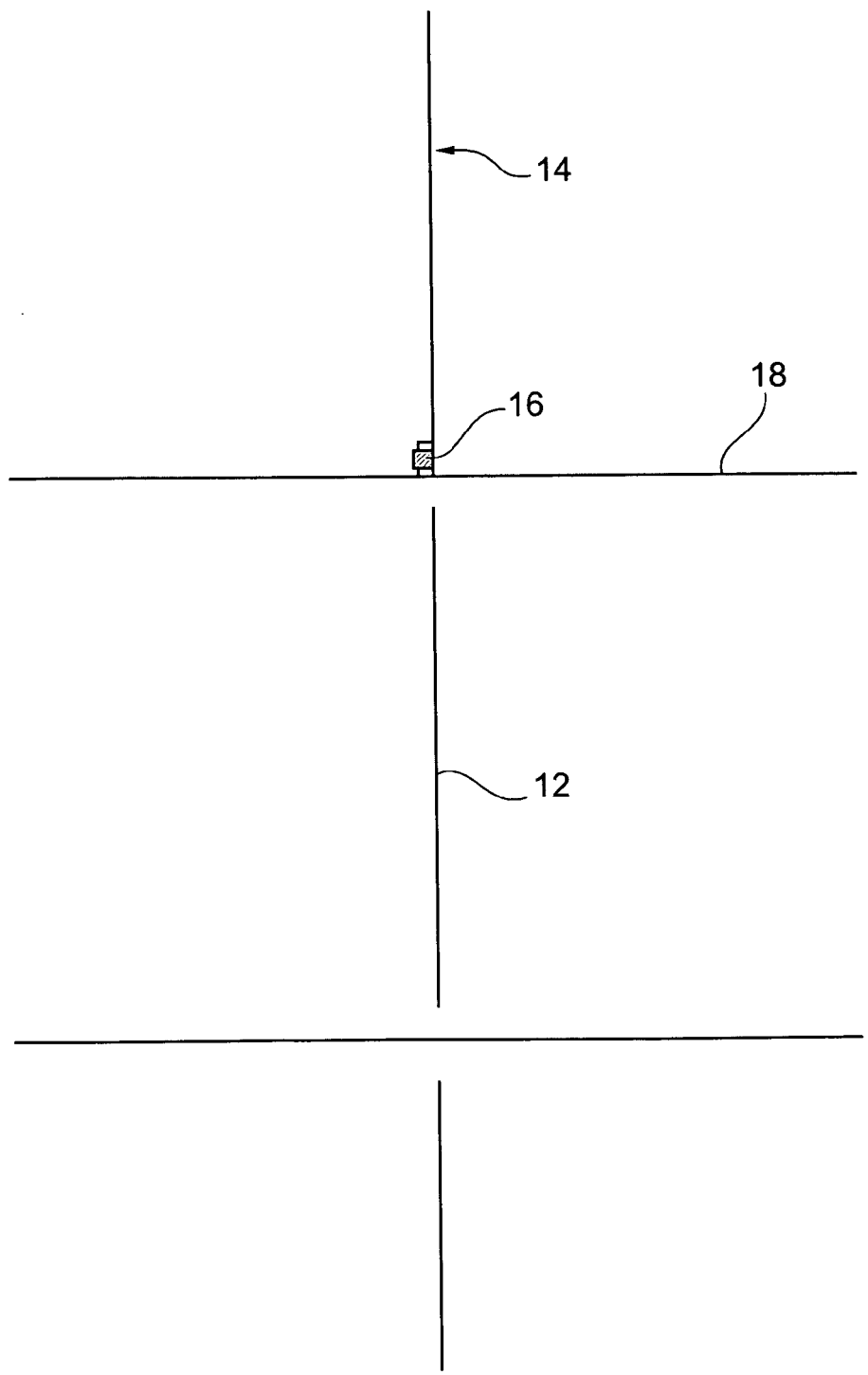
FIG. 4 shows a prototype with a groundplane antenna on a 1:1 scale.

FIGS. 3 and 4 each show prototypes at the scale of 1:1 and specifically FIG. 3 similar to FIG. 1 with a dipole antenna and FIG. 4 similar to FIG. 2 with a groundplane antenna.

The circuit modules 16 can be connected to their antenna connections at the connection points of the antenna components, e.g. by crimped connections and can be fixed on the textile material. Crimped connections cling mechanically securely to the electrically conductive threads when the circuit module is inserted. If the circuit module is to be connected to a continuous conductive thread, this can be separated centrally at the same time during the connection process by means of a separating tool. For this purpose either a separating slitter is itself arranged on the circuit module or a cutting strip is arranged to form a counterpart for an externally guided knife, e.g. in a hand crimping tool. A laser cutting device can also be used instead of a mechanical knife.

Figure 5:
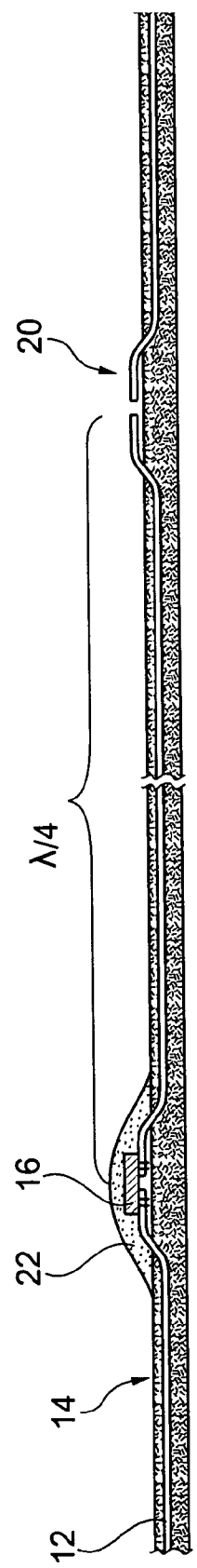
FIG. 5 shows an embodiment of the textile material according to the invention.

The conductive threads 12 can be concealed inside the textile material and only emerge at predefined outlet points 20 to form the connections points at the surface as shown in FIG. 5. This also applies to the formation of antenna ends, that is the hot ends of the antenna if continuously conductive threads are to be separated. The spacings of the outlet points correspond to a quarter of the wavelength (λ/4) of the working frequency.

In the case of continuously electrically conductive threads, the circuit module can be crimped thereto at their outlet point and the threads must be separated at the connection point thus formed between the antenna connections of the circuit module and at the antenna ends for tuning the antenna components to the working frequency. In the case of electrically partially conducting threads, crimping the threads at the outlet point to the antenna connections of the circuit module is sufficient.

The circuit module 16 itself and its antenna connections are preferably enclosed by a potting compound 22 and the potting compound 22 is at the same time connected to the region of the textile material adjacent to the circuit module 16 for mechanical fixing of the circuit module 16 and/or increasing the security against tampering. The circuit module 16 is fixed to the textile material by the potting compound 22 such that the potting compound 22 penetrates deep into the textile material as a result of the capillary effect. Separation is only possible by destruction so that tampering can be identified. Furthermore, the circuit module 16 is protected against mechanical and chemical influences by the potting compound 22. The additional incorporation of the antenna connections provides protection of the contacts and at the same time provides stress relief at the antenna ends, reducing the risk of breakage at the antenna connections of the circuit module.

The invention claimed is:

1. A textile material with antenna components of an HF transponder operated by connection of a circuit module to the antenna components which are tuned to a working frequency, wherein the antenna components consist of electrically conductive components of the textile material itself which are formed as an E-field antenna, using the geometry thereof to match a working frequency in the UHF or microwave range, or by interruption or extension of a conductive section, wherein the antenna components are arranged with mutual spacing between the antenna components or are arranged in groups of antenna components with mutual spacing between the antenna components in each group.

2. The textile material according to claim 1, wherein the antenna components form at least one symmetrical λ/2 dipole or at least one λ/4 groundplane comprising a λ/4 antenna and a counterpoise, wherein λ corresponds to the wavelength of the working frequency.

3. The textile material according to claim 1, wherein the electrically conductive components of the textile material are electrically conducting thread structures processed mechanically within a normal production process for the textile industry.

4. The textile material according to claim 3, wherein the electrically conductive thread structure is a metal-coated plastic thread, a plastic thread wound with metal wire, a plastic thread wound with a metal stranded wire, a plastic thread with an integral metal wire, a plastic thread with an integral metal stranded wire or a graphite thread.

5. The textile material according to claim 4, wherein the electrically conductive thread structure comprises continuously conducting threads.

6. The textile material according to claim 5, wherein adjacent threads are separated when connecting a circuit module.

7. The textile material according to claim 4, wherein the electrically conductive thread structure comprises partially conducting threads between connection points and antenna ends.

8. The textile material according to claim 4, wherein the threads come to the surface of the textile material at outlet points which correspond to the position of connection points and antenna ends.

9. The textile material according to claim 8, wherein the outlet points have a spacing of λ/4 of the wavelength of the working frequency.

10. The textile material according to claim 1, wherein antenna components comprise at least one connection point for connection to antenna connections of the circuit module by crimp connections, welded connections, soldered connections or adhesive connections using conductive adhesive.

11. The textile material according to claim 10, wherein adhesive surfaces of adhesive compounds are UV-permeable and the conductive adhesive is UV curable.

12. The textile material according to claim 1, wherein the circuit module itself and its antenna connections are enclosed by a potting compound and the potting compound is at the same time connected to the region of the textile material adjacent to the circuit module for mechanical fixing of the circuit module and/or increasing the security against tampering.

* * * * *